United States Patent
Lee

(10) Patent No.: US 7,804,526 B2
(45) Date of Patent: Sep. 28, 2010

(54) AUTO WHITE BALANCE METHOD USING WINDOWS OF A PLURALITY OF WINDOWS THAT FORM AN IMAGE AND IMAGE PHOTOGRAPHING APPARATUS USING THE SAME

(75) Inventor: Hyung-jin Lee, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 496 days.

(21) Appl. No.: 11/608,020

(22) Filed: Dec. 7, 2006

(65) Prior Publication Data

US 2008/0012957 A1 Jan. 17, 2008

(30) Foreign Application Priority Data

Jul. 12, 2006 (KR) ...................... 10-2006-0065566

(51) Int. Cl.
*H04N 9/73* (2006.01)
*G03B 7/16* (2006.01)

(52) U.S. Cl. .................................... 348/223.1; 382/167
(58) Field of Classification Search ............... 348/223.1
See application file for complete search history.

(56) References Cited

U.S. PATENT DOCUMENTS

| 5,282,022 | A | * | 1/1994 | Haruki et al. ............ 348/223.1 |
|---|---|---|---|---|
| 5,485,202 | A | * | 1/1996 | Ueda ........................ 348/223.1 |
| 5,760,831 | A | * | 6/1998 | Tanaka et al. ............ 348/223.1 |
| 5,831,672 | A | * | 11/1998 | Takei ........................ 348/225.1 |
| 6,522,353 | B1 | * | 2/2003 | Saito et al. ............... 348/223.1 |
| 6,727,943 | B1 | * | 4/2004 | Juen ........................ 348/223.1 |
| 2004/0130632 | A1 | * | 7/2004 | Shiraishi ................ 348/223.1 |
| 2006/0087566 | A1 | * | 4/2006 | Abe ........................ 348/223.1 |

FOREIGN PATENT DOCUMENTS

| JP | 06098336 A | * | 4/1994 |
|---|---|---|---|
| JP | 2002095004 A | * | 3/2002 |
| JP | 2003199124 A | * | 7/2003 |

OTHER PUBLICATIONS

Translation of JP 06-098336 A.*

* cited by examiner

*Primary Examiner*—John M Villecco
(74) *Attorney, Agent, or Firm*—Stanzione & Kim LLP

(57) ABSTRACT

An auto white balance (AWB) method and an image photographing apparatus using the same. The AWB method includes selecting parts of a plurality of windows that form an image, and performing an AWB of the image, based on color difference signals of the selected windows, thereby reducing a time to transmit AWB data to calculate color difference integration, i.e., AWB data to be used to perform the AWB, to reduce the extent of calculation to calculate the color difference integration, and efficiently to perform the AWB of the image.

31 Claims, 6 Drawing Sheets

AUTO WHITE BALANCE METHOD USING WINDOWS OF A PLURALITY OF WINDOWS THAT FORM AN IMAGE AND IMAGE PHOTOGRAPHING APPARATUS USING THE SAME

CROSS-REFERENCE TO RELATED APPLICATIONS

This application claims the benefit under 35 U.S.C. §119 (a) of Korean Patent Application No. 2006-65566, filed Jul. 12, 2006, the contents of which are hereby incorporated in its entirety by reference.

BACKGROUND OF THE INVENTION

1. Field of the Invention

The present general inventive concept relates to an auto white balance (AWB) method and an image photographing apparatus using the same, and more particularly, to an AWB method which is efficient for a high definition image and an image photographing apparatus using the same.

2. Description of the Related Art

An image photographing apparatus records, on a recording medium, an image generated by picking up a subject. Examples of an image photographing apparatus are a digital camera and a digital camcorder. For more natural color reproduction, an image photographing apparatus performs an auto white balance (AWB) of the pick-up image and then records the image.

Generally, An AWB method is performed by integrating color difference by using color difference signals of a pick-up image, and adjusting a gain for each color signal based on the calculated integration of the color difference. The pick-up image 10 is divided into four (4) windows ①, ②, ③ and ④, as illustrated in FIG. 1, and the color difference integration is calculated with respect to each window.

The AWB performed by the above-described AWB method is suitable for an image of standard definition (SD) but not suitable for an image of high definition (HD). In an HD image, since the size of a pick-up image is very big, the extent of calculation required for the integration of color difference significantly increases.

Specifically, when the AWB is performed by picking up an image in a high speed mode, the number of images being picked-up per unit hour is greater than in a normal mode, and it takes long time to transmit data required for performing the AWB. Furthermore, the extent of calculation for the integration of color difference increases.

SUMMARY OF THE INVENTION

The present general inventive concept provides an auto white balance (AWB) method which is more efficient to reduce a time to transmit data used to perform an AWB and to decrease the extent of calculation to integrate color difference of the data, and an image photographing apparatus using the same.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing an AWB method including selecting parts of a plurality of windows that form an image, and performing an AWB of the image, based on color difference signals of the selected windows.

A number of the selected windows may be a value, which is derived by dividing a total number of the windows that form the image by a specific fixed number.

The specific fixed number may be a fixed number indicating a speed of a photographing mode.

A number of the selected windows may be determined, by a user, through a menu screen on a display.

The windows formed in at least one row may be selected from the plurality of the windows that form the image.

A number of the rows of the selected windows may be a value which is derived by dividing the total number of the rows of the windows that form the image by the specific fixed number.

The windows formed in at least one column may be selected from the plurality of the windows that form the image.

A number of the columns of the selected windows may be a value which is derived by dividing the total number of columns of the windows that form the image by the specific fixed number.

The plurality of the windows that form the image may be divided into groups, each group having a specific number of windows, and at least one window of each group of the windows may be selected.

The selected windows may be determined by a user.

The AWB method may further include displaying a plurality of the windows that form the image, including the selected windows.

The AWB performing may further include calculating AWB data to be used to perform the AWB of the image, by using color difference signals of the selected windows, and performing the AWB of the image, based on the calculated AWB data.

The foregoing and/or other aspects and utilities of the present general inventive concept may also be achieved by providing an image photographing apparatus including an AWB unit to select parts of a plurality of windows that form an image, and a controller to perform an AWB of the image, based on color difference signals of the selected windows.

A number of the selected windows may be a value which is derived by dividing the total number of the windows that form the image by a specific fixed number.

The specific fixed number may be a fixed number indicating a speed of a photographing mode.

The image photographing apparatus may further include a display to display a menu screen to be used to determine the number of the selected windows by a user.

The AWB unit may select the windows formed in at least one row from the plurality of the windows that form the image.

A number of the rows of the selected windows may be a value which is derived by dividing the number of the rows of the windows that form the image by the specific fixed number.

The AWB unit may select the windows formed in at least one column from the plurality of the windows that form the image.

A number of the columns of the selected windows may be a value which is derived by dividing the number of the columns of the windows that form the image by the specific fixed number.

The AWB unit may divide the plurality of the windows that form the image into groups, each group having a specific number of windows, and select at least one window from each group of the windows.

The selected windows may be determined by a user.

The image photographing apparatus may further include a display to display the plurality of the windows that form the image, including the selected windows.

The AWB unit may calculate AWB data to be used to perform the AWB of the image, by using color difference signals of the selected windows.

The AWB unit may perform the AWB of the image, based on the calculated AWB data.

The foregoing and/or other aspects and utilities of the present general inventive concept may also be achieved by providing an auto white balance (AWB) method, including selecting portions of an image, and performing an AWB of the image by changing gains of signals corresponding to the selected portions.

The performing of the AWB may include calculating color differences of the selected portions, and determining a plurality of gain values corresponding to the respective calculated color differences.

The gains of the signals corresponding to the selected portions may be changed based on the determined plurality of gain values.

The foregoing and/or other aspects and utilities of the present general inventive concept may also be achieved by providing an image photographing apparatus, including a selection unit to select portions of an image, an automatic white balancing unit to calculate color differences of the selected portions, and a digital signal processor (DSP) to change gains of the selected portions based on the calculated color differences.

The foregoing and/or other aspects and utilities of the present general inventive concept may also be achieved by providing an auto white balance (AWB) method, including converting an optical image signal into a digital image signal, dividing the digital image signal into a plurality of windows and calculating color differences of a selected portion of the windows, determining a plurality of gain values corresponding to the respective calculated color differences, and adjusting a plurality of gains of the digital image signal using the determined plurality of gain values.

The foregoing and/or other aspects and utilities of the present general inventive concept may also be achieved by providing an image photographing apparatus, including a pick up unit to convert an optical image signal from a lens into a digital image signal, an automatic white balancing unit to divide the digital image signal into a plurality of windows and calculate color differences of a selected portion of the windows, a controller to determine a plurality of gain values corresponding to the calculated color differences, and a gain adjuster to adjust a plurality of gain values of the digital image signal using the plurality of gain values corresponding to the calculated color differences.

The foregoing and/or other aspects and utilities of the present general inventive concept may also be achieved by providing an auto white balance (AWB) method, including determining a photography mode of a picked-up image, dividing the picked-up image into a plurality of windows, selecting a portion of windows from the plurality of windows, the portion corresponding to the a number corresponding to the photography mode, calculating color differences of the selected portion of windows, and adjusting gains of the picked-up image based on the calculated color differences.

The foregoing and/or other aspects and utilities of the present general inventive concept may also be achieved by providing an auto white balance (AWB) apparatus, including a pick up unit to pick up an image, an automatic white balancing unit to determine a photography mode, divide the pick-ed up image into a plurality of windows, select a portion of the windows, the selected portion corresponding to a number corresponding to the photography mode, and calculate color differences of the selected portion of the windows, and a controller to adjust gains of the pick-ed up image based on the calculated color differences.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

Throughout the drawings, the same reference numerals will be understood to refer to the same elements, features, and structures.

DETAILED DESCRIPTION OF THE PREFERRED EMBODIMENTS

Figure 1:
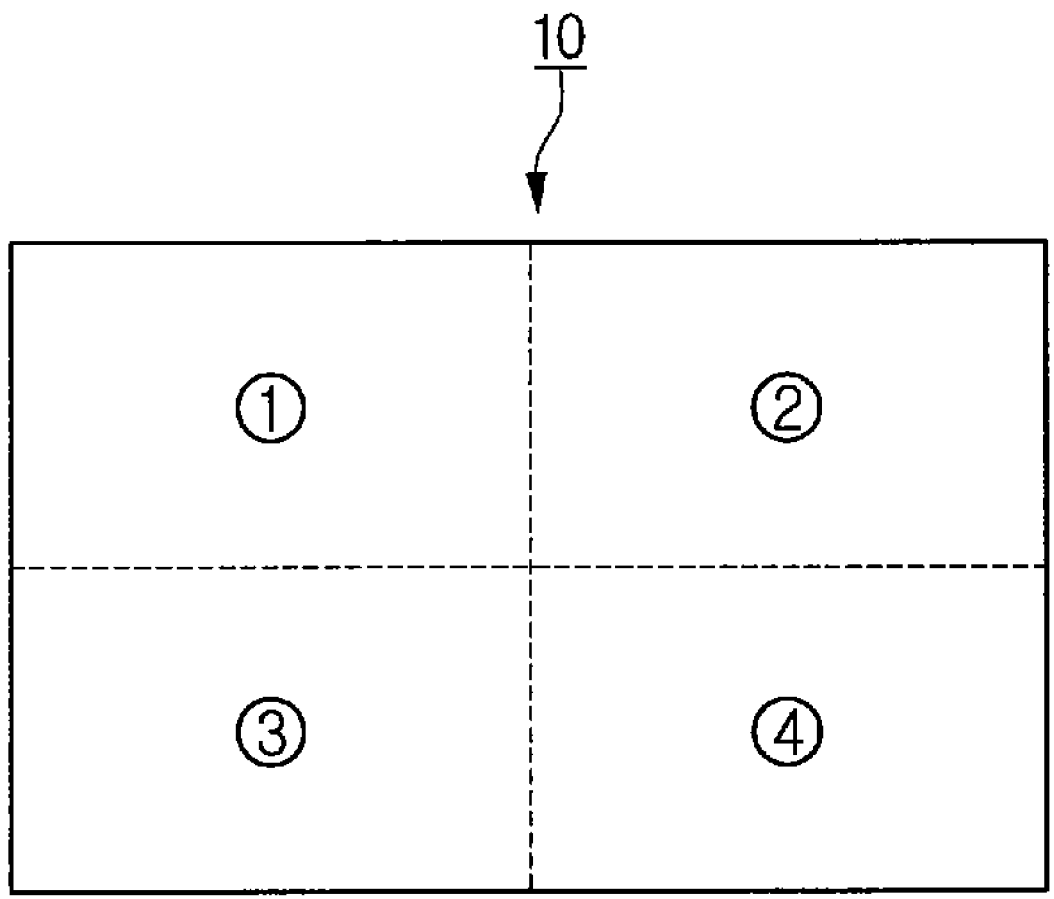
FIG. 1 is a view illustrating a pick-up image divided into four (4) windows.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
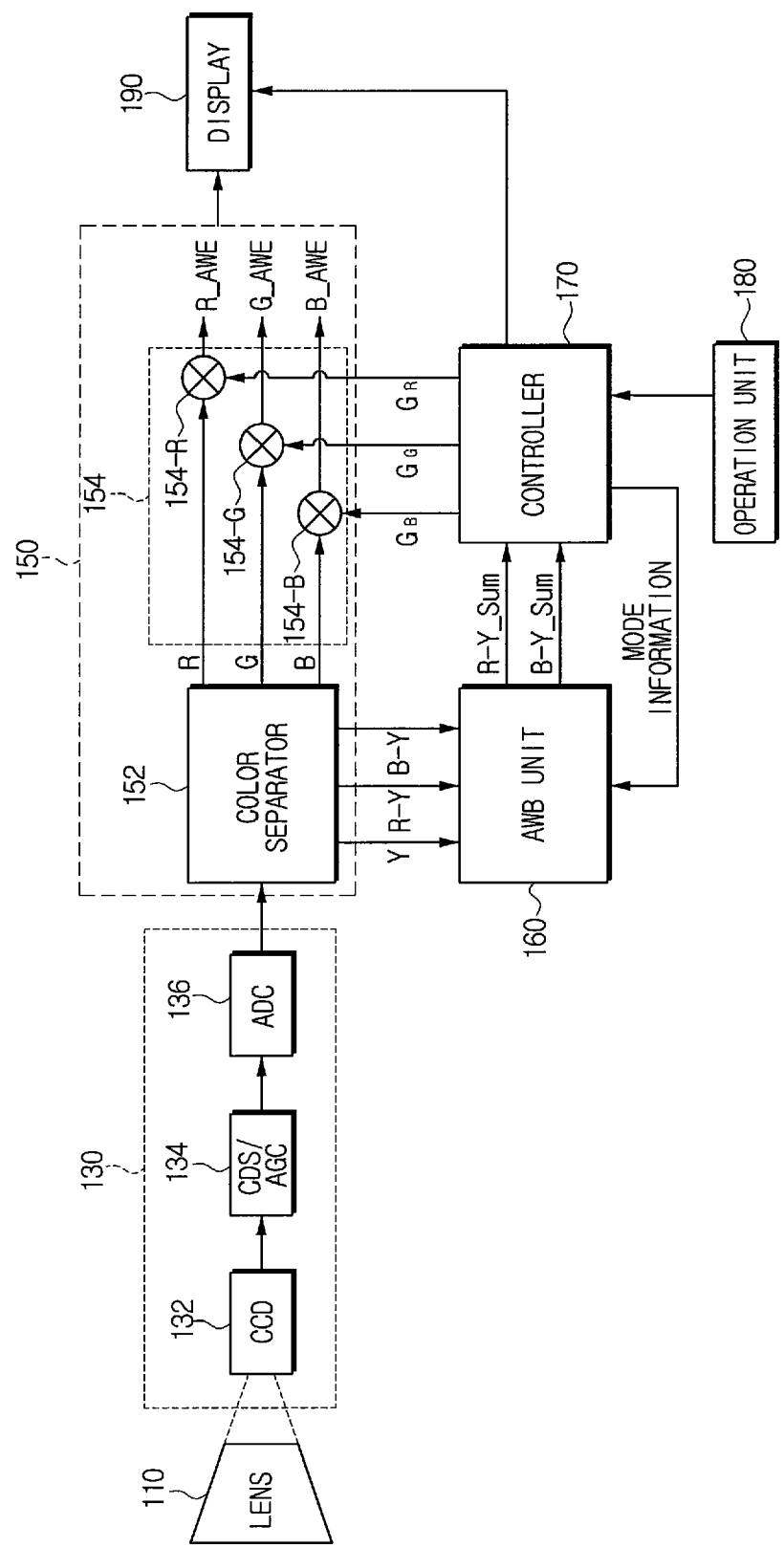
FIG. 2 is a block diagram illustrating a digital camcorder in accordance with an embodiment of the present general inventive concept.

FIG. 2 is a block diagram illustrating a digital camcorder to which the present general inventive concept is applicable. As illustrated in FIG. 2, the digital camcorder includes a lens 110, a pick-up unit 130, a digital signal processor (DSP) 150, an auto white balance (AWB) unit 160, a controller 170, an operation unit 180, and a display 190.

The pick-up unit 130 converts an optical image signal entering from the lens 110 into an electrical image signal. The pick-up unit 130 includes a charge coupled device (CCD) 132, a correlated double sampler (CDS)/auto gain controller (AGC) 134, and an analog to digital converter (ADC) 136.

The CCD 132 is a pick-up device to pick up an optical image of a subject being input through the lens 110 and then generate a corresponding image signal. The CDS/AGC 134 removes noise of the image signal being output from the CCD 132 and maintains a uniform level of the image signal. The ADC 136 converts an analog (e.g. optical) image signal being output from the CDS/AGC 134 to a digital (e.g. electrical) image signal.

The pick-up unit 130 may also include a complementary metal oxide semiconductor (CMOS) type pick-up element. Unlike the CCD 132, the CMOS does not need to additionally include the CDS/AGC 134 and the ADC 136, to convert the optical image signal to the electrical image signal.

The DSP unit 150 includes a color separator 152 and a gain adjustor 154.

The color separator 152 sorts a brightness (Y) signal and color difference (R−Y/B−Y) signals from the digital image signal applied from the ADC 136 and applies the sorted Y/R−Y/B−Y signals to the AWB unit 160, which will be described later. The color separator 152 converts the Y/R−Y/B−Y signals into RIG/B signals.

The gain adjustor 154 adjusts a gain for each of the R/G/B signals being output from the color separator 152. The gain adjustor 154 includes an R-gain adjustor 154-R to adjust a gain for the R signal, a G-gain adjustor 154-G to adjust a gain for the G signal, and a B-gain adjustor 154-B to adjust a gain for the B signal. The AWB is performed with respect to the pick-up image, through the gain adjustments of the R-gain adjustor 154-R, the G-gain adjustor 154-G, and the B-gain adjustor 154-B. The controller 170 determines an amount the gains are adjusted.

The AWB unit 160 calculates color difference integration (R−Y_Sum/B−Y_Sum), using the Y/R−Y/B−Y signals applied from the color separator 152. The color difference integration (R−Y_Sum/B−Y_Sum) is AWB data to be used when the AWB is performed with respect to the pick-up image. A calculation method of the color difference integration (R−Y_Sum/B−Y_Sum) by the AWB unit 160 differs according to different image photographing modes of the digital camcorder. Specifically, the calculation method of the color difference integration (R−Y_Sum/B−Y_Sum) by the AWB unit 160 depends on the photographing mode, i.e., normal mode or high speed mode, in the pick-up image, which will be described in detail later. The AWB unit 160 recognizes the photographing mode of the digital camcorder, based on mode information transferred from the controller 170, to be described below.

The controller 170 performs the AWB of the pick-up image, based on the color difference integration (R−Y_Sum/B−Y_Sum) calculated in the AWB unit 160. The controller 170 determines respective amounts of the gains being adjusted, $G_R$, $G_G$ and $G_B$, for the RIG/B signals in the pick-up image, based on the color difference integration (R−Y_Sum/B−Y_Sum). Then, the controller 170 applies the determined amounts of the gains being adjusted, $G_R$, $G_G$ and $G_B$, to the R-gain adjustor 154-R, the G-gain adjustor 154-G, and the B-gain adjustor 154-B, respectively. The controller 170 controls the windows performing the AWB to be displayed on the display, together with the pick-up image. The controller 170 also controls a menu screen to be displayed on the display so that a user may select a number of widows to perform the AWB.

Figure 3:
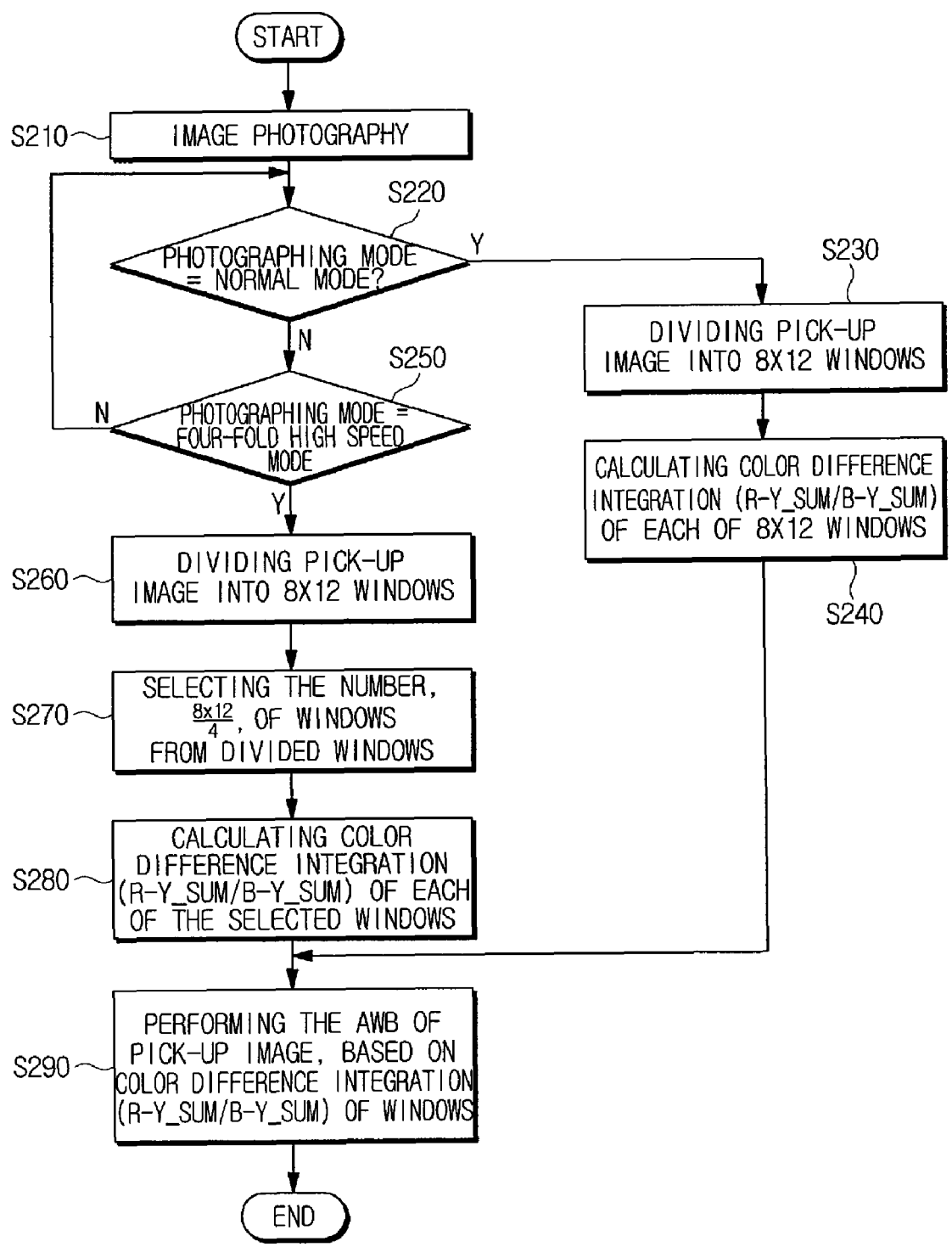
FIG. 3 is a flow chart illustrating an auto white balance (AWB) method in accordance with another embodiment of the present general inventive concept.

Below, a method of performing the AWB in a digital camcorder in accordance with an embodiment of the present general inventive concept will be described, in detail, in reference to FIG. 3. FIG. 3 is a flow chart illustrating an AWB method which is efficient for a high density image, in accordance with another embodiment of the present general inventive concept.

As illustrated in FIG. 3, the digital camcorder picks up an image in operation S210. Specifically, operation S210 is performed by operations of a correlated double sampler, an auto gain controller, and an A/D converter with respect to an image signal generated through a process of converting an optical image signal to an electrical image signal by the charge coupled device (CCD) 132 of FIG. 2.

The AWB unit 160 of FIG. 2 determines an image photographing mode in operations S220 and S250. The determination operation of the AWB unit 160 includes mode information which is transferred from the controller 170 of FIG. 2.

When the image photographing mode is determined as a normal mode in operation S220, the AWB unit 160 divides the pick-up image into ninety-six (96) windows in a tile pattern in operation S230 and calculates color difference integration (R−Y_Sum/B−Y_Sum) for each of the ninety-six (96) windows in the divided tile pattern in operation S240. The ninety-six (96) windows are formed in eight (8) rows and twelve (12) columns.

Based on the color difference integration (R−Y_Sum/B−Y_Sum) for each of the 96 windows, the AWB is performed with respect to the pick-up image in operation S290.

When the photographing mode is determined as a high speed mode in operation S250, the AWB unit 160 divides the pick-up image into ninety-six (96) windows in a tile pattern in the same way as the normal mode in operation S260.

The AWB unit 160 selects twenty-four (24) windows from the ninety-six (96) divided windows in operation S270. Twenty-four (24) is a value derived by dividing ninety-six (96), which is the total number of the divided windows, by four (4), which is a speed of the high speed mode. A method of selecting windows by the AWB unit 160 may include an auto processing method by a particular process or a method of selecting the windows to be subjected to the AWB by a user. The method of selecting the windows will be described later, in reference to FIG. 4.

Dividing the pick-up image into the ninety-six (96) windows and selecting the twenty-four (24) windows, reduces, per frame, an amount of data transmitted to the AWB unit 160 to perform the AWB, thereby preventing a data transmission time from being longer.

The AWB unit 160 calculates color difference integration (R−Y_Sum/B−Y_Sum) for each of the selected twenty-four (24) windows in operation S280. Calculating the color difference integration (R−Y_Sum/B−Y_Sum) for the selected twenty-four (24) windows reduces a time required to calculate the color difference integration (R−Y_Sum/B−Y_Sum).

That is, the number of images being picked-up per unit hour in the high speed mode is greater than in the normal mode. As a result, in the high speed mode, when transmitting the data of all windows that form the image and calculating the color difference integration (R−Y_Sum/B−Y_Sum) for all windows as in the normal mode, a much longer time is required to transmit the data and to calculate the color difference integration (R−Y_Sum/B−Y_Sum).

Accordingly, when transmitting data for the color difference integration (R−Y_Sum/B−Y_Sum) for only some of the windows that form the image, a time to transmit the data and to calculate the AWB data is reduced and the extent of calculation for the color difference integration (R−Y_Sum/B−Y_Sum) is also reduced.

In operation S290, the AWB is performed with respect to the pick-up image, based on the color difference integration (R−Y_Sum/B−Y_Sum) of the windows.

Below, a method of selecting twenty-four (24) windows from divided ninety-six (96) windows will be described in reference to FIGS. 4A through 4E, while maintaining the context of FIGS. 2-3.

Figure 4A:
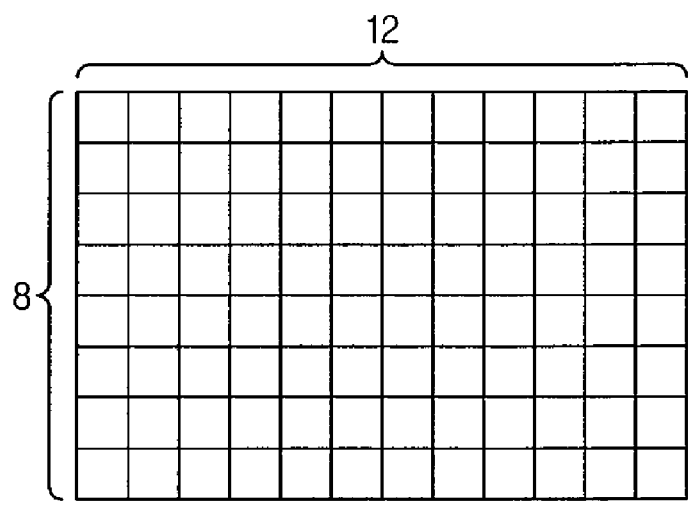
FIGS. 4A through 4E are views illustrating a method of dividing a pick-up image into ninety-six (96) windows and selecting parts of the divided windows.

FIGS. 4A through 4E illustrate a method of selecting twenty-four (24) windows to perform the AWB of the ninety-six (96) windows that form an image. FIG. 4A illustrates a pick-up image divided into ninety-six (96) windows in a tile pattern. The ninety-six (96) windows are formed by eight (8) rows and twelve (12) columns.

Figure 4B:
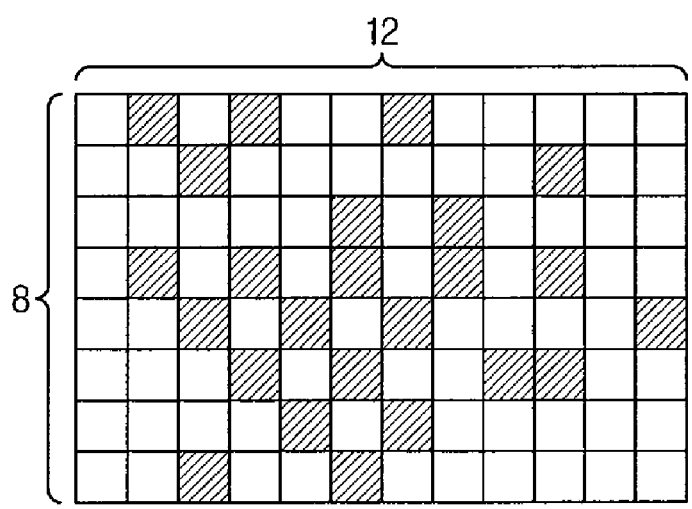

FIG. 4B illustrates an example when twenty-four (24) windows are optionally selected, the twenty-four (24) being a value which is derived by dividing ninety-six (96), which is the total number of the windows in the tile pattern, by four (4), which is the speed of the high speed mode.

Figure 4C:
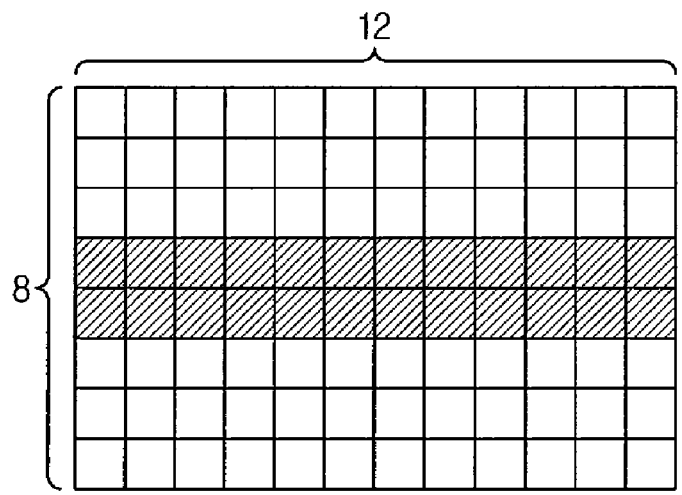

As illustrated in FIG. 4C, the ninety-six (96) windows in the tile pattern are formed in a total of eight (8) rows. When the windows are selected from the rows, FIG. 4C illustrates an example when two (2) rows are optionally selected, the two (2) being a value which is derived by dividing eight (8), which is the total number of the rows of the windows that form the image, by four (4), which is the speed of the high speed mode.

Figure 4D:
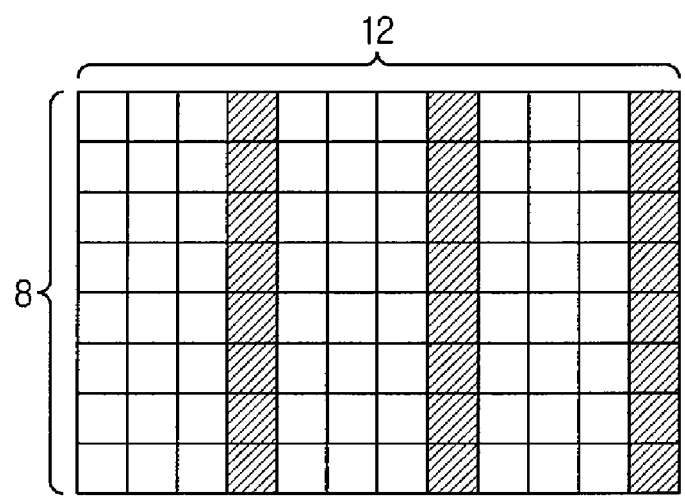

As illustrated in FIG. 4D, the ninety-six (96) windows in the tile pattern are formed in a total of twelve (12) columns. When the windows are selected from the columns, FIG. 4D illustrates an example when three (3) columns are optionally selected, the three (3) being a value which is derived by dividing twelve (12), which is the total number of the columns of the windows that form the image, by four (4), which is the speed of the high speed mode.

Figure 4E:
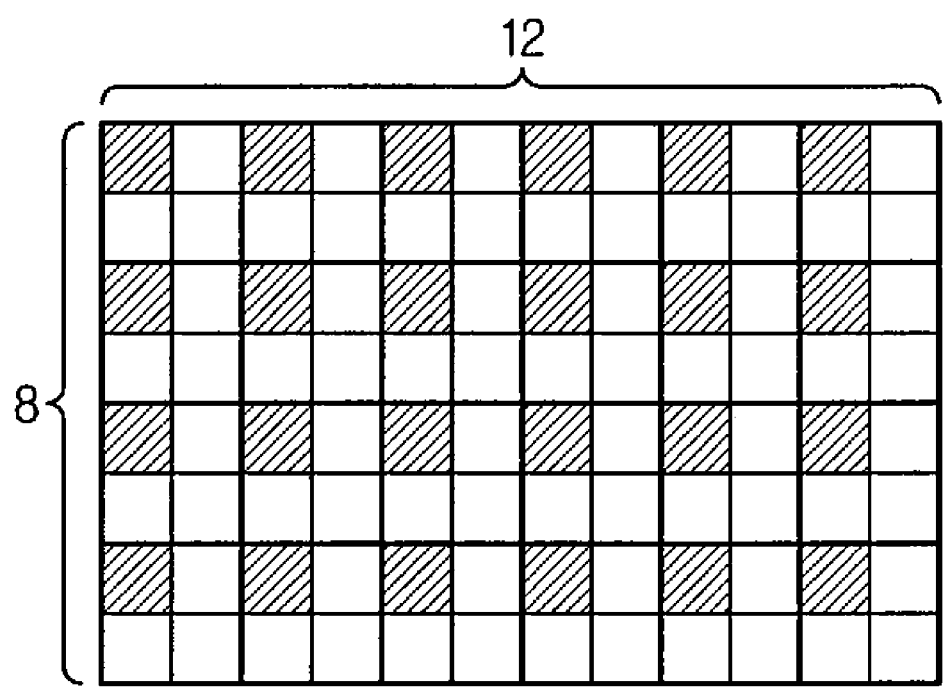

FIG. 4E illustrates a method of forming four (4) windows in one group in reference to the four-fold high speed mode, and selecting one window from each group being formed. As described above, the method of selecting parts of the windows that form the image in the four-fold high speed mode includes selecting twenty-four (24) windows, the twenty-four (24) being a value which is derived by dividing ninety-six (96), which is the total number of the windows that form each image, by four (4), which is the speed of the high speed mode. However, the method is not limited to the embodiment as illustrated. A user may directly select the windows required to perform the AWB using the operation unit 180. Specifically, when the divided windows that form the image are displayed on the display 190, the user selects the windows to perform the AWB using the selected windows. Then, the controller 170 controls such that the AWB is performed using the windows selected by the user, and it also controls the display 190 to display the selected windows on the display 190.

The user may select the number of the windows required to perform the AWB through a menu screen. The menu screen is a user interface which is displayed on the display 190 enabling the user to select a photographing mode, the number of the windows required to perform the AWB, etc. When the number of the required windows is selected, the AWB is performed by any one of the methods illustrated in FIGS. 4B through 4E. The user also selects the number of the windows required to perform the AWB and selects the windows according to the selected number.

The windows required to perform the AWB may be automatically selected. Accordingly, the controller 170 controls the display 190 to display the divided windows that form the image and the selected windows on the display 190.

The method of performing the AWB, specifically, the AWB method which is efficient for the image in the high speed mode, has been described with reference to the preferred embodiments. In the embodiments, the high speed mode is four-fold but it may be two-fold, five-fold, six-fold, etc. Moreover, the AWB method in accordance of the present general inventive concept can be applied in the normal mode which is one-fold, to perform the faster AWB.

In the embodiments, the pick-up image is divided into ninety-six (96) windows in the tile pattern. The number or pattern of divided windows is not limited. Thus, an image may be divided into windows according to methods other than those illustrated in FIGS. 4A through 4E.

The definition of a pick-up image is not limited. The technical idea of the present general inventive concept is applied to a pick-up image irrespective of its definition.

The present general inventive concept is applicable to an image photographing apparatus to pick up an image and to record the pick-up image on a recording medium. That is, the present general inventive concept is applicable to not only a digital camcorder but also a digital camera, a monitoring camera such as a CCTV, a mobile phone camera and other image photographing apparatus. The present general inventive concept is also applicable to an image photographing apparatus performing the AWB by receiving a pick-up image being input.

As described above, the AWB method in accordance with the present general inventive concept reduces a time to transmit data used to perform the AWB of an image and reduces the extent of calculation for the color difference integration of the data. The reduction in the data transmission time and the extent of calculation improves the speed of the AWB and reduces power consumption during the AWB, thereby efficiently performing the AWB of the image.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An auto white balance (AWB) method, comprising:
    selecting windows from a plurality of windows that form an image if a photographing mode is a high speed mode; and
    performing an AWB of the image, based on color difference signals of the selected windows,
    wherein a number of the selected windows and high speed mode are directly determined by a user through a menu screen on a display.

2. The method as claimed in claim 1, wherein a number of the selected windows is a value derived by dividing a total number of the windows that form the image by a specific fixed number.

3. The method as claimed in claim 2, wherein the specific fixed number indicates a speed of the photographing mode.

4. The method as claimed in claim 1, wherein the selecting of the windows from the plurality of the windows that form the image comprises:
    selecting windows formed in at least one row from the plurality of the windows that form the image.

5. The method as claimed in claim 4, wherein a number of the rows is a value derived by dividing the total number of the rows of the windows that form the image.

6. The method as claimed in claim 1, wherein the selecting of the windows from the plurality of the windows that form the image comprises:
    selecting windows formed in at least one column from the plurality of the windows that form the image.

7. The method as claimed in claim 6, wherein a number of the columns is a value derived by dividing the total number of the columns of the windows that form the image.

8. The method as claimed in claim 1, wherein the selecting of the windows from the plurality of the windows that form the image comprises:
    dividing the plurality of the windows into groups, each group having a specific number of windows; and
    selecting at least one window from each group.

9. The method as claimed in claim 1, wherein the selected windows are determined by a user.

10. The method as claimed in claim 1, further comprising:
    displaying the plurality of the windows that form the image, including the selected windows.

11. The method as claimed in claim 1, wherein the performing of the AWB further comprises:
    calculating AWB data to be used to perform the AWB of the image, by using the color difference signals of the selected windows; and
    performing the AWB of the image, based on the calculated AWB data.

12. An image photographing apparatus, comprising:
an AWB unit to select windows from of a plurality of the windows that form the image if a photographing mode is a high speed mode; and
a controller to perform an AWB of the image, based on color difference signals of the selected windows,
wherein a number of the selected windows and high speed mode are directly determined by a user through a menu screen on a display.

13. The apparatus as claimed in claim 12, wherein a number of the selected windows is a value derived by dividing a total number of the windows that form the image by a specific fixed number.

14. The apparatus as claimed in claim 13, wherein the specific fixed number indicates a speed of the photographing mode.

15. The apparatus as claimed in claim 12, further comprising:
a display to display a menu screen to be used by a user to determine the number of the selected windows.

16. The apparatus as claimed in claim 12, wherein the AWB unit selects windows formed in at least one row from the plurality of the windows that form the image.

17. The apparatus as claimed in claim 16, wherein a number of the rows of the selected windows may be a value which is derived by dividing the number of the rows of the windows that form the image by the specific fixed number.

18. The apparatus as claimed in claim 12, wherein the AWB unit selects the windows formed in at least one column from the plurality of the windows that form the image.

19. The apparatus as claimed in claim 18, wherein a number of the columns of the selected windows may be a value which is derived by dividing the number of the columns of the windows that form the image by the specific fixed number.

20. The apparatus as claimed in claim 12, wherein the AWB unit divides the plurality of the windows into groups, each group having a specific number of windows, and selects at least one window from each group.

21. The apparatus as claimed in claim 12, wherein the selected windows are determined by a user.

22. The apparatus as claimed in claim 12, further comprising:
a display to display the plurality of the windows that form the image, including the selected windows.

23. The apparatus as claimed in claim 12, wherein the AWB unit calculates AWB data to be used to perform the AWB of the image, by using color difference signals of the selected windows.

24. An auto white balance (AWB) method, comprising:
selecting portions of windows of an image if a photographing mode is a high speed mode; and
performing an AWB of the image by changing gains of signals corresponding to the selected portions,
wherein a number of the selected windows and high speed mode are directly determined by a user through a menu screen on a display.

25. The AWB method of claim 24, wherein the performing of the AWB comprises:
calculating color differences of the selected portions; and
determining a plurality of gain values corresponding to the respective calculated color differences.

26. The AWB method of claim 25, wherein the gains of the signals corresponding to the selected portions are changed based on the determined plurality of gain values.

27. An image photographing apparatus, comprising:
a selection unit to select portions of windows of an image if a photographing mode is a high speed mode;
an automatic white balancing unit to calculate color differences of the selected portions; and
a digital signal processor (DSP) to change gains of the selected portions based on the calculated color differences,
wherein a number of the selected windows and high speed mode are directly determined by a user through a menu screen on a display.

28. An auto white balance (AWB) method, comprising:
converting an optical image signal into a digital image signal;
dividing the digital image signal into a plurality of windows and calculating color differences of a selected portion of the windows if a photographing mode is a high speed mode;
determining a plurality of gain values corresponding to the respective calculated color differences; and
adjusting a plurality of gains of the digital image signal using the determined plurality of gain values,
wherein a number of the selected windows and high speed mode are directly determined by a user through a menu screen on a display.

29. An image photographing apparatus, comprising:
a pick up unit to convert an optical image signal from a lens into a digital image signal;
an automatic white balancing unit to divide the digital image signal into a plurality of windows and calculate color differences of a selected portion of the windows if a photographing mode is a high speed mode;
a controller to determine a plurality of gain values corresponding to the calculated color differences; and
a gain adjuster to adjust a plurality of gain values of the digital image signal using the plurality of gain values corresponding to the calculated color differences,
wherein the portion of windows selected and high speed mode are directly determined by a user through a menu screen on a display.

30. An auto white balance (AWB) method, comprising:
determining a photographing mode of a picked-up image;
dividing the picked-up image into a plurality of windows;
selecting a portion of windows from the plurality of windows if the photographing mode is a high speed mode, the portion corresponding to the a number corresponding to the photographing mode;
calculating color differences of the selected portion of windows; and
adjusting gains of the picked-up image based on the calculated color differences,
wherein a number of the selected windows and high speed mode are directly determined by a user through a menu screen on a display.

31. An auto white balance (AWB) apparatus, comprising:
a pick up unit to pick up an image;
an automatic white balancing unit to determine a photographing mode, divide the pick-ed up image into a plurality of windows, select a portion of the windows if the photographing mode is a high speed mode, the selected portion corresponding to a number corresponding to the photographing mode, and calculate color differences of the selected portion of the windows; and
a controller to adjust gains of the pick-ed up image based on the calculated color differences,
wherein the portion of windows selected and high speed mode are directly determined by a user through a menu screen on a display.

* * * * *